(12) United States Patent
Matsui (10) Patent No.: US 9,530,360 B2
(45) Date of Patent: Dec. 27, 2016

(54) SENSOR DEVICE, LIQUID CRYSTAL DISPLAY DEVICE, SENSING METHOD AND PROGRAM

(71) Applicant: NEC Display Solutions, Ltd., Tokyo (JP)

(72) Inventor: Katsuyuki Matsui, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 14/894,445

(22) PCT Filed: May 29, 2013

(86) PCT No.: PCT/JP2013/064923
§ 371 (c)(1),
(2) Date: Nov. 27, 2015

(87) PCT Pub. No.: WO2014/192101
PCT Pub. Date: Dec. 4, 2014

(65) Prior Publication Data
US 2016/0111048 A1    Apr. 21, 2016

(51) Int. Cl.
*H05B 37/02*     (2006.01)
*G09G 3/34*      (2006.01)
*G01J 1/42*      (2006.01)
*H05B 33/08*     (2006.01)

(52) U.S. Cl.
CPC ........... *G09G 3/3406* (2013.01); *G01J 1/42* (2013.01); *G09G 3/3413* (2013.01); *H05B 33/0848* (2013.01); *H05B 37/0227* (2013.01); *G09G 2320/064* (2013.01); *G09G 2320/0666* (2013.01); *G09G 2360/145* (2013.01)

(58) Field of Classification Search
CPC ............... G09G 3/3406; G09G 3/3413; G09G 2320/064; G09G 2360/145; G01J 1/42; H05B 33/0848; H05B 37/0227
USPC ................. 315/151, 294, 297, 307
See application file for complete search history.

(56) References Cited

U.S. PATENT DOCUMENTS

| | | | |
|---|---|---|---|
| 5,786,801 A * | 7/1998 | Ichise | G09G 3/3406 345/102 |
| 2009/0001251 A1* | 1/2009 | Ng | G01J 1/32 250/205 |

FOREIGN PATENT DOCUMENTS

| | | |
|---|---|---|
| JP | 2005-258403 A | 9/2005 |
| JP | 2007-318050 A | 12/2007 |
| JP | 2009-070977 A | 4/2009 |

(Continued)

OTHER PUBLICATIONS

International Search Report in PCT/JP2013/064923 dated Jul. 9, 2013 (English Translation Thereof).

*Primary Examiner* — Daniel D Chang
(74) *Attorney, Agent, or Firm* — McGinn IP Law Group, PPLC (57) ABSTRACT

A sensor device includes: a light sensor that acquires a first light quantity measurement value that is proportional to a light quantity of a backlight and a first measurement time; a light quantity target value calculating unit that calculates a light quantity target value based on a user setting for the backlight; and a measurement time calculating unit that calculates a second measurement time for when the light sensor acquires a second light quantity measurement value a next time, based on the acquired first light quantity measurement value and the light quantity target value.

9 Claims, 7 Drawing Sheets

(56) References Cited

FOREIGN PATENT DOCUMENTS

| JP | 2011-034026 A | 2/2011 |
|----|---------------|--------|
| JP | 2012-177953 A | 9/2012 |

* cited by examiner

SENSOR DEVICE, LIQUID CRYSTAL DISPLAY DEVICE, SENSING METHOD AND PROGRAM

TECHNICAL FIELD

The present invention relates to a sensor device that senses a light quantity of a backlight, a sensing method, a liquid crystal display device that uses the sensor device or the sensing method, and a program.

BACKGROUND ART

An LED backlight using an LED (Light Emitting Diode) as a light source has been adopted for recent liquid crystal display devices. Moreover, some of the recent LED backlights can control the light quantity for each of R (red), G (green), and B (blue) (or for each part thereof) individually, and can adjust a color balance of the backlight in addition to a brightness of the backlight.

The liquid crystal display device using the above-described LED backlight can generally change the brightness of the backlight to a brightness desired by a user, for example, based on a designation by the user. However, because the LED has an individual difference in an actual color or light quantity, the brightness or a color balance may be different for each backlight. Moreover, an output of the LED varies according to operating conditions, for example, the color changes and the light quantity decreases with an increase of temperature. Consequently, it is difficult to match the brightness of the backlight with the brightness desired by the user, by only a simple control based on the brightness designated by the user, independently of the individual differences and the operating conditions, without losing the color balance while mixing three colors of R, G, and B (more colors depending on the backlight).

As a method to solve the above-described problem, a method using a light sensor (color sensor) that can measure a light quantity for each color component (R, G, and B) included in received light has been proposed (for example, refer to Patent Document 1). The light sensor receives a part of light emitted from the backlight to measure the light quantity for each of R, G, and B of the light actually emitted by the backlight at a current time. A backlight (BL) control unit performs control (feedback control) to adjust drive conditions of the backlight sequentially, based on a light quantity measurement value for each of R, G, and B acquired via the light sensor.

Figure 7:
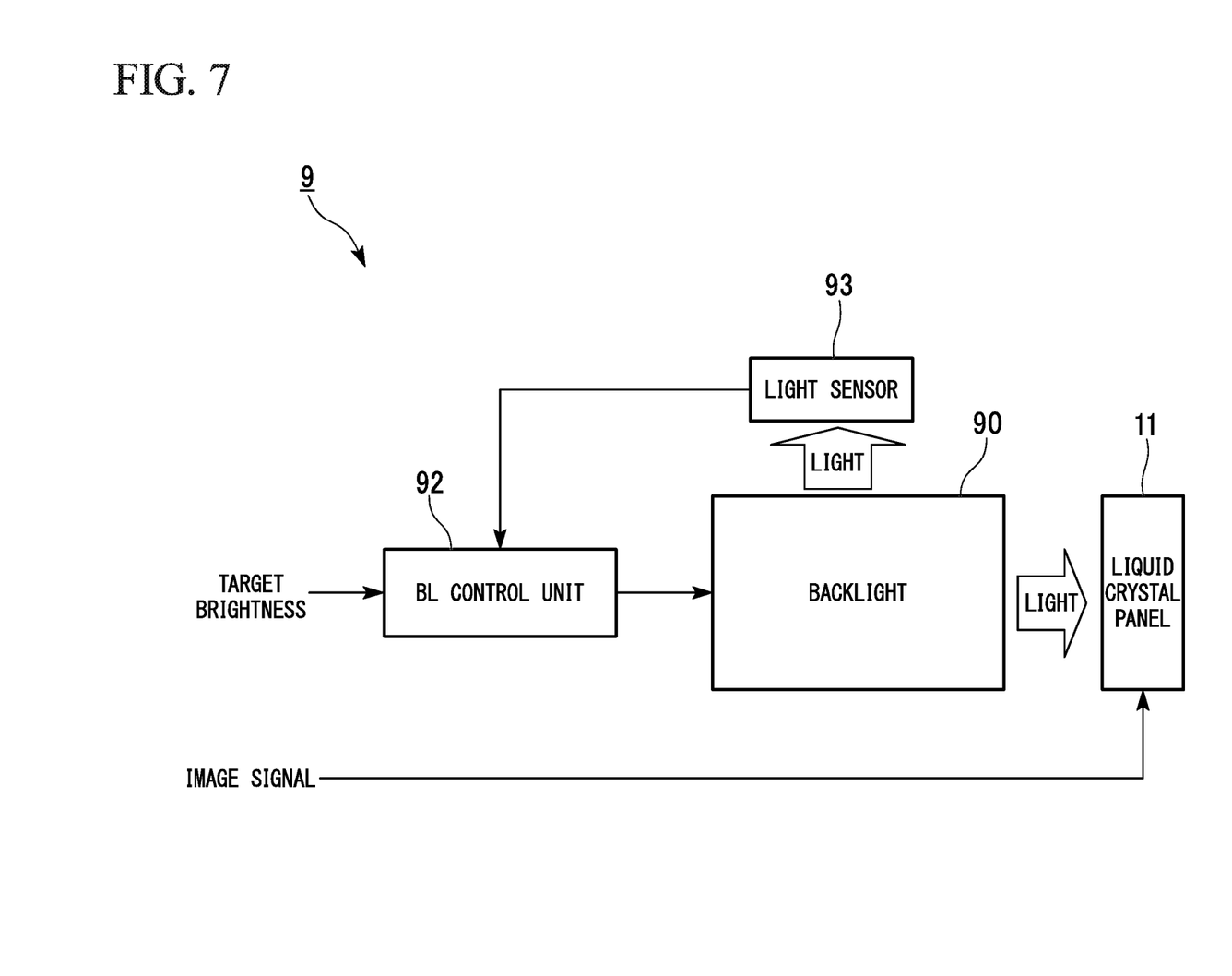
FIG. 7 is a diagram showing a functional configuration of a liquid crystal display device related to the present invention.

FIG. 7 is a diagram showing a functional configuration of a liquid crystal display device according to the present invention. In FIG. 7, reference symbol 9 denotes a liquid crystal display device.

Hereunder, an example of a liquid crystal display device that performs feedback control by using the above-described light sensor will be described with reference to FIG. 7. As shown in FIG. 7, the liquid crystal display device 9 includes a backlight 90, a liquid crystal panel 91, a BL (backlight) control unit 92, and a light sensor 93.

The backlight 90 includes, for example, out of a R (red), G (green), and B (blue), a G LED light source and a B LED light source, and is an LED backlight for which it is possible to independently control a light quantity of G and a light quantity of B. In this case, a light quantity of R is uniquely decided incidentally based on the controlled light quantity of G and the light quantity of B.

The backlight 90 may be a backlight that includes LED light sources for each of R, G, and B for which it is possible to independently control each light quantity. Moreover, in this case, the backlight 90 may include a light source for other different colors in addition to R, G, and B.

The liquid crystal panel 91 is a functional unit that forms an image based on an image signal input from outside, and causes a viewer to visually recognize the image through light entering from the backlight 90.

The light sensor 93 is a digital color sensor that receives a part of the light emitted from the backlight 90, and outputs the light quantity for each of R, G, and B of the light as numerical values.

The BL control unit 92 performs control so as to match the brightness of the light emitted from the backlight 90 with a predetermined target brightness, by controlling the light quantity of G and the light quantity of B based on the predetermined target brightness. The target brightness is the brightness of the backlight 90, for example, designated by the user and desired by the user. Specifically, the BL control unit 92 receives a light quantity measurement value for each of R, G, and B acquired by the light sensor 93, and compares the brightness acquired based on the light quantity measurement value, with the target brightness desired by the user, and controls so that these agree with each other.

Brightness is generally expressed by a value acquired by multiplying each of the light quantity of R, the light quantity of G, and the light quantity of B respectively by a predetermined coefficient (respectively designated as r, g, and b), and adding the acquired values (r×R+g×G+b×B (R, U, and B are light quantities of respective colors)). For example, if the light quantity (per unit of time) detected for each of R, G, and B by the light sensor 93 is (R, G, B)=(95, 100, 90), the brightness of light is calculated by (r×95+g×100+b×90). The BL control unit 92 acquires the measurement value of the brightness by performing the above-described arithmetic processing using the light quantity measurement value for each of R, G, and B input from the light sensor 93.

Here, for example, even if the brightness calculated by (r×95+g×100+b×90) agrees with the target brightness, if the originally set color balance is (R:G:B=1:1:1), the condition to maintain the color balance is not satisfied. Consequently, the BL control unit 92 performs control to maintain the color balance (R:G:B=1:1:1), while adjusting the brightness of the backlight 90 to the target brightness based on the light quantity measurement value for each of R, G, and B input from the light sensor 93.

By realizing the above-described feedback control, the BL control unit 92 can perform control to adjust the color balance and to match the brightness of the backlight 90 with the brightness desired by the user, regardless of the individual difference of the backlight 90 and the operating conditions thereof.

As in the above-described liquid crystal display device 9, recently, a digital color sensor has been used as the light sensor for space saving and cost reduction. The general digital color sensor integrates each light quantity of the R component, the G component, and the B component of the light to be received, over a predetermined measurement time, and outputs the integrated value as a numerical value (digital value) after passage of the measurement time.

PRIOR ART DOCUMENT

Patent Document

[Patent Document 1] Japanese Unexamined Patent Application, First Publication No. 2007-318050

SUMMARY OF THE INVENTION

Problem to be Solved by the Invention

However, the above-described liquid crystal display device 9 has a problem as described below.

First, in order to accurately perform the feedback control by the BL control unit, accuracy above a certain level is required for the light quantity measurement value output from the color sensor. Here, "accuracy above a certain level is required" means, more specifically, that the light quantity measurement amount itself needs to be a certain numerical value or more. That is to say, the acquired light quantity measurement value is superimposed with a certain measurement variation. If the acquired light quantity measurement value is small because of small brightness, a proportion of the variation in the light quantity measurement value relatively increases, thereby generating a large error. On the other hand, if the light quantity measurement value is a certain numerical value or more, the proportion of variation decreases relatively, and hence, as a result, the measurement value has a small error.

Here, as described above, the color sensor outputs the light quantity measurement value indicating the value obtained by integrating the light quantities to be received during the measurement time, that is, a product of the light quantities to be received and the measurement time. Consequently, when the brightness of the backlight is low, the measurement time needs to be set long in order to prevent the light quantity to be received from decreasing and decreasing the accuracy (the light quantity measurement value).

However, in the digital color sensor, the light quantity measurement value is updated first after passage of the measurement time. Therefore, as the measurement time is set longer, a cycle to update the light quantity measurement value is also extended. That is to say, in the liquid crystal display device, if control to acquire a certain level of accuracy at all times is performed, then in the digital color sensor, if the brightness of the backlight is small, the update cycle of the light quantity measurement value is extended.

If the update cycle of the light quantity measurement value output from the digital color sensor is extended, the BL control unit also requires time for the feedback control, and the time until the brightness of the backlight is matched with the brightness desired by the user is also extended.

In backlights to be used for recent liquid crystal display devices, the width between a maximum value and a minimum value (dynamic range) of the brightness that can be set is large. For example, the backlight includes one that can set the brightness from a minimum brightness of 20 cd/m$^2$ to a maximum brightness of 400 cd/m$^2$. When the digital color sensor is to measure the light quantity of such a backlight, for example, even if sufficient accuracy (light quantity measurement value) can be acquired within a measurement time of 0.4 seconds with the maximum brightness (400 cd/m$^2$), in order to acquire the same accuracy with the minimum brightness (20 cd/m$^2$) a measurement time of 8 seconds is required. Consequently, in this case, the light quantity measurement value of the color sensor is updated to a new value only after 8 seconds.

Thus, the above-described liquid crystal display device has a problem in that the time until the brightness is adjusted to the brightness desired by the user is extended when the brightness of the backlight is low.

Accordingly, it is an exemplary object of the present invention to provide a sensor device, a liquid crystal display device, a sensing method, and a program in order to solve the above-described problem.

Means for Solving the Problem

The present invention has been conceived in order to solve the above-described problem, and provides a sensor device including: a light sensor that acquires a light quantity measurement value that is proportional to a light quantity of a backlight and a measurement time; a light quantity target value calculating unit that calculates a light quantity target value based on a user setting for the backlight; and a measurement time calculating unit that calculates the measurement time for when the light sensor acquires the light quantity measurement value a next time, based on the acquired light quantity measurement value and the light quantity target value.

Moreover, the present invention provides a sensing method wherein: a light sensor acquires a light quantity measurement value that is proportional to a brightness of a backlight and a measurement time; a light quantity target value calculating unit calculates a light quantity target value based on a user setting for the backlight; and a measurement time calculating unit that calculates the measurement time for when the light sensor acquires the light quantity measurement value a next time, based on the acquired light quantity measurement value and the light quantity target value.

Furthermore, the present invention provides a program that causes a computer of a sensor device including a light sensor that acquires a light quantity measurement value that is proportional to a brightness of a backlight and a measurement time, to function as: a light quantity target value calculating means that calculates a light quantity target value based on a user setting for the backlight; and a measurement time calculating means that calculates the measurement time for when the light sensor acquires the light quantity measurement value a next time, based on the acquired light quantity measurement value and the light quantity target value.

Effect of the Invention

According to the sensor device of the present invention, the time until brightness is adjusted to the brightness desired by a user can be reduced.

EMBODIMENTS FOR CARRYING OUT THE INVENTION

Hereunder, a sensor device according to a first exemplary embodiment of the present invention will be described with reference to the drawings.

Figure 1:
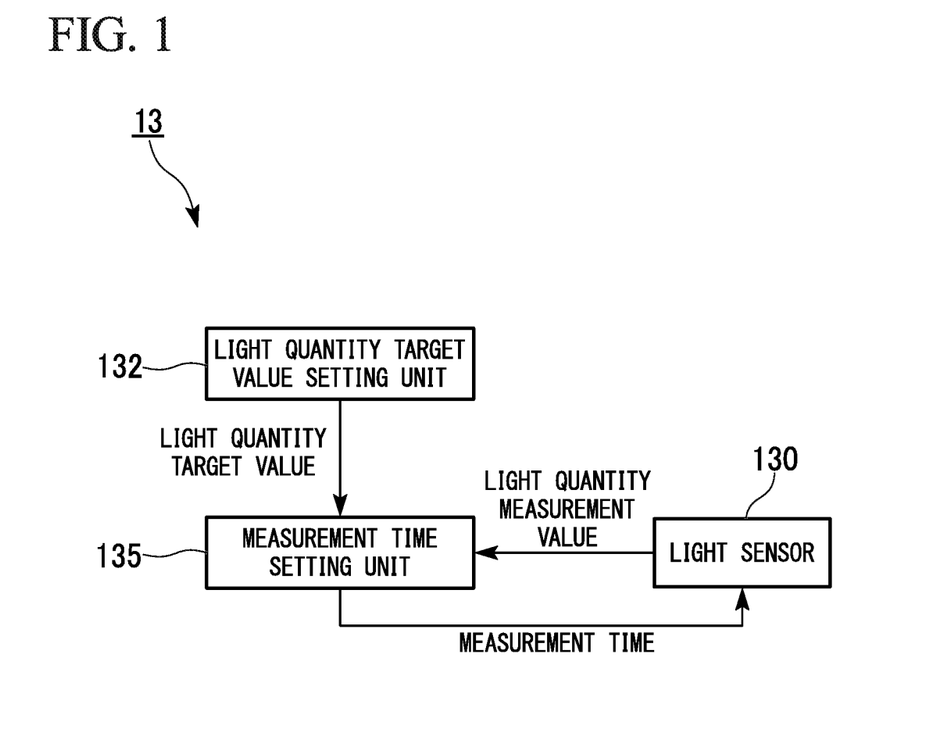
FIG. 1 is a diagram showing a minimum configuration of a sensor device according to a first exemplary embodiment of the present invention.

FIG. 1 is a diagram showing a minimum configuration of a sensor device according to the first exemplary embodiment of the present invention. In this figure, reference symbol 13 denotes the sensor device.

As shown in FIG. 1, the sensor device 13 includes a light sensor 130 that acquires a light quantity measurement value that is proportional to a product of a light quantity of a backlight and a measurement time, and a light quantity target value calculating unit 132 that calculates a light quantity target value based on a user setting for the backlight. Moreover, the sensor device 13 includes a measurement time calculating unit 135 that calculates a measurement time for when the light sensor 130 acquires the light quantity measurement value a next time, based on the light quantity measurement value acquired by the light sensor 130 and the light quantity target value.

Hereunder, a specific configuration example for when the sensor device 13 shown in FIG. 1 is installed in a liquid crystal display device including an LED backlight will be described.

Figure 2:
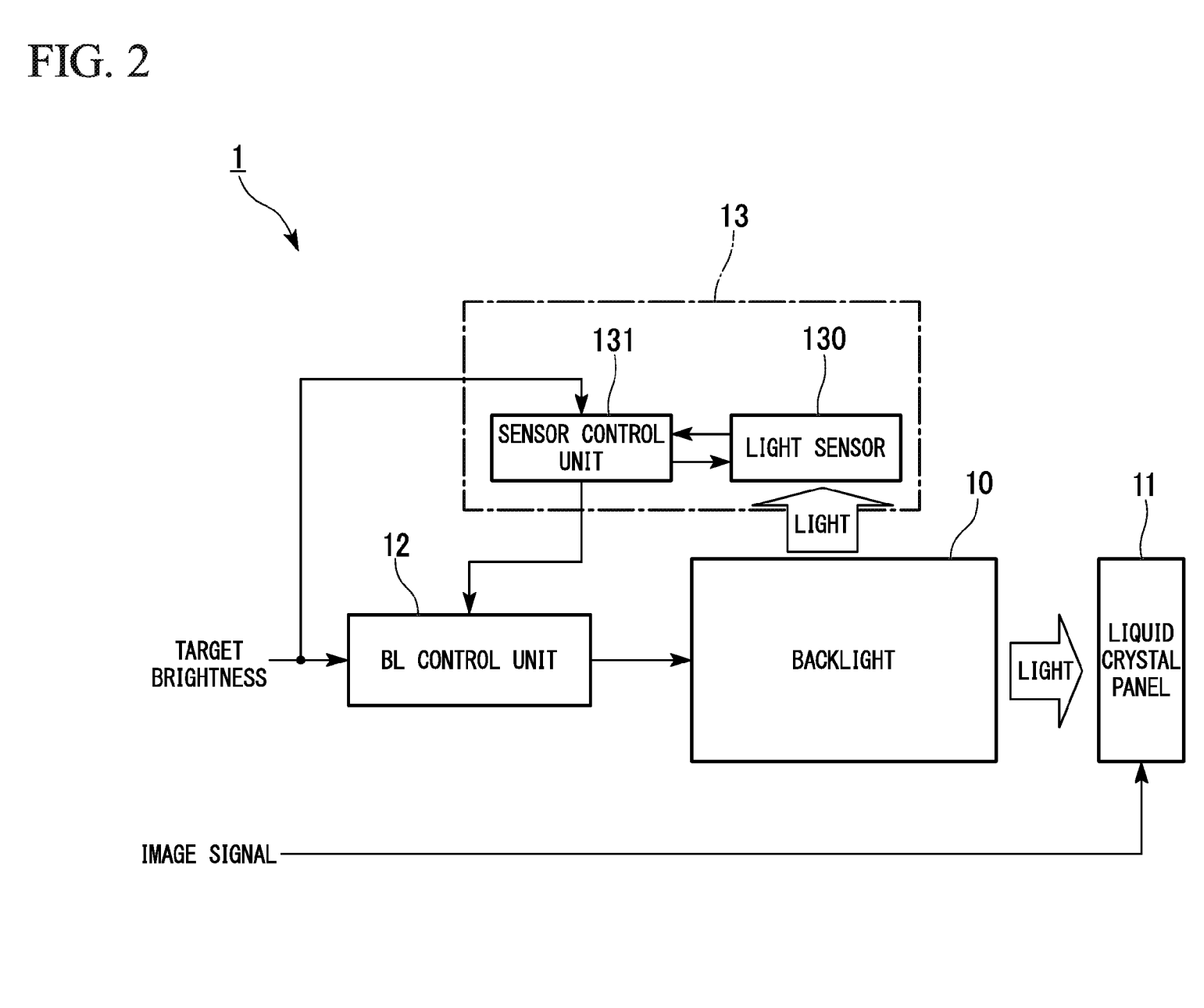
FIG. 2 is a diagram showing a functional configuration of a liquid crystal display device according to the first exemplary embodiment of the present invention.

FIG. 2 is a diagram showing a functional configuration of the liquid crystal display device according to the first exemplary embodiment of the present invention.

As shown in FIG. 2, a liquid crystal display device 1 includes a backlight 10, a liquid crystal panel 11, a BL (backlight) control unit 12, and the sensor device 13.

The backlight 10 includes, out of a R (red), G (green), and B (blue), a G LED light source and a B LED light source, and is an LED backlight for which it is possible to independently control a light quantity of G and a light quantity of B. In this case, R phosphor is applied to the G LED light source and B LED light source, and a light quantity of R is uniquely decided incidentally based on the controlled light quantity of G and the light quantity of B.

The functional configuration of the backlight 10 is not limited to the above exemplary embodiment. The backlight 10 according to other exemplary embodiments of the present invention may include, for example, an LED light source for each of R, G, and B, and may be a backlight for which it is possible to independently control each light quantity. Furthermore, in this case, the backlight 10 may include a light source for other different colors in addition to R, G, and B.

The liquid crystal panel 11 is a functional unit that forms an image based on an image signal input from outside, and causes a viewer to visually recognize the image through light entering from the backlight 10.

The BL control unit 12 is a functional unit that controls drive of the backlight 10 based on the target brightness and brightness information of the backlight 10 input from the sensor device 13 described later. Specifically, the BL control unit 12 performs control so as to match the brightness of the light emitted from the backlight 10 with the target brightness, by controlling the light quantity of G and the light quantity of B based on the target brightness. The target brightness here is the brightness of the backlight 10, for example, designated by a user and desired by the user. Specifically, the BL control unit 12 receives a light quantity measurement value for each of R, G, and B of the backlight 10 acquired by the sensor device 13, and compares the brightness acquired based on the light quantity measurement value, with the target brightness desired by the user, and performs feedback control so that these values agree with each other.

The sensor device 13 is a functional unit that receives a part of the light emitted from the backlight 10, quantifies the light quantity of light, and outputs it. Here, the sensor device 13 according to the present exemplary embodiment includes the light sensor 130 and a sensor control unit 131.

The light sensor 130 is a digital color sensor that receives light and outputs a light quantity of the light for each of R, G, and B as numerical values. The light sensor 130 integrates each light quantity of the R component, the G component, and the B component of the light to be received, over a predetermined measurement time, and outputs a light quantity measurement value, being the integrated total value, after passage of the measurement time. Consequently, the light quantity measurement value is a value that is proportional to the light quantity of the backlight 10 and the measurement time.

The sensor control unit 131 outputs information based on the light quantity measurement value input from the light sensor 130 (a normalized light quantity measurement value described later), to the BL control unit 12. The BL control unit 12 performs control of the brightness of the backlight 10 based on the target brightness and the normalized light quantity measurement value input from the sensor control unit 131.

On the other hand, the sensor control unit 131 performs a process of setting the measurement time for when the light sensor 130 acquires the light quantity measurement value a next time, based on the target brightness and the information of the light quantity measurement value input from the light sensor 130 (the normalized light quantity measurement value). Details of the process will be described later.

Figure 3:
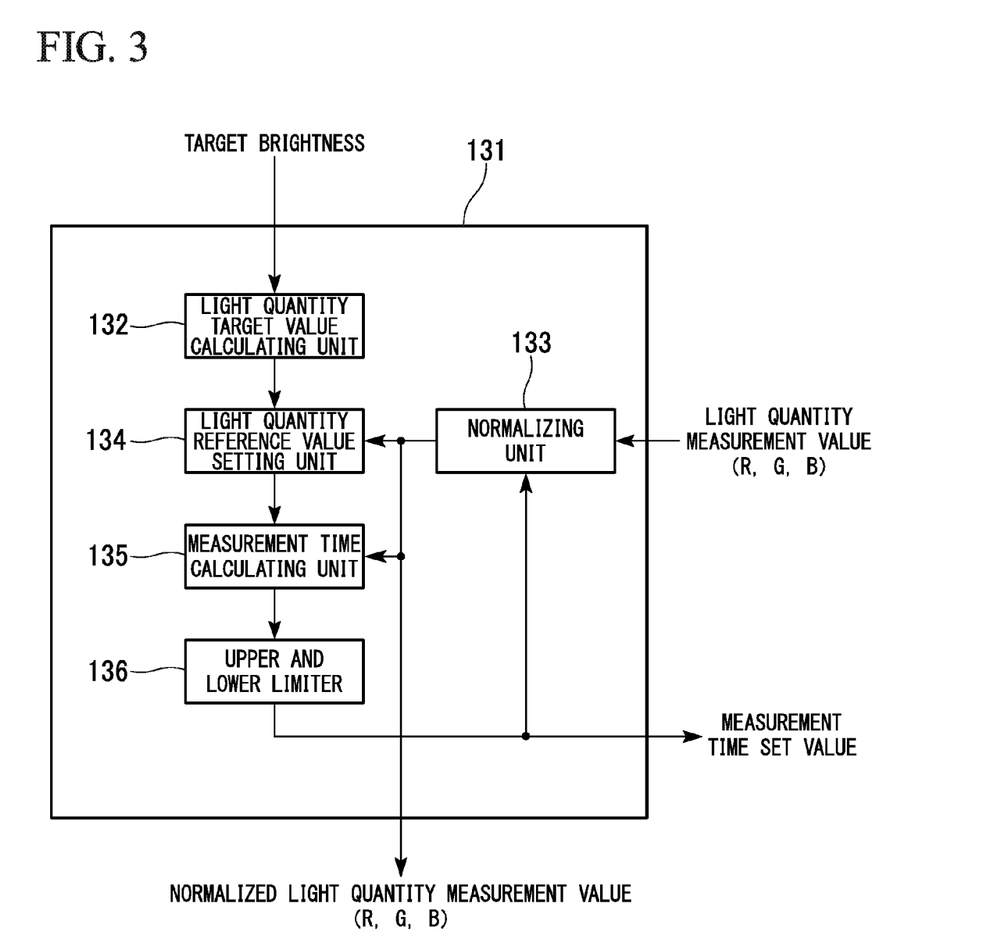
FIG. 3 is a diagram showing a functional configuration of a sensor control unit according to the first exemplary embodiment of the present invention.

FIG. 3 is a diagram showing a functional configuration of the sensor control unit according to the first exemplary embodiment of the present invention.

As shown in FIG. 3, the sensor control unit 131 includes therein the light quantity target value calculating unit 132, a normalizing unit 133, a light quantity reference value setting unit 134, the measurement time calculating unit 135, and an upper and lower limiter 136.

The light quantity target value calculating unit 132 refers to the target brightness designated by the user, and calculates a value to be acquired via the light sensor 130 (the light quantity target value) in order to achieve the target brightness. Brightness is generally expressed by a value acquired by multiplying each of the light quantity of R, the light quantity of G, and the light quantity of B respectively by a predetermined coefficient (respectively designated as r, g, and b), and adding the acquired values (r×R+g×G+b×B (R, G, and B are light quantities of the respective colors)). The light quantity target value calculating unit 132 calculates each light quantity (light quantity target value) of R, G, and B in order to achieve the target brightness, for example, based on the above-described arithmetic expression. If the target brightness is changed by designation of the user, the light quantity target value calculating unit 132 newly computes the light quantity target value in order to achieve the changed target brightness. At this time, the light quantity target value calculating unit 132 calculates the light quantity target value of each color so that the color balance of R, G, and B (R: G: B) does not fluctuate before and after the change.

The light quantity target value of each of R, G, and B is described as LtR, LtG, and LtB.

The normalizing unit 133 is a functional unit that converts the light quantity measurement value acquired from the light sensor 130 into a normalized light quantity measurement value that does not depend on the measurement time. As described above, the light sensor 130 outputs the light quantity measurement value indicating the total of the light quantity integrated during the predetermined measurement time. Consequently, in order to read the effective light quantity of the backlight 10 from the light quantity measurement value acquired from the light sensor 130, a value eliminating a component of the integration time (measurement time) needs to be used. Specifically, the normalizing unit 133 calculates the normalized light quantity measurement value by dividing the light quantity measurement value acquired by the light sensor 130 by the measurement time for when the light quantity measurement value is acquired. The normalized light quantity measurement value calculated in this manner indicates the light quantity detected per unit of time (for example, in 1 second). Consequently, if there is a plurality of light quantity measurement values acquired at different measurement times, only the magnitude of the light quantity cannot be compared among the light quantity measurement values. However, the magnitude of the light quantity can be compared among the normalized light quantity measurement values corresponding to the respective light quantity measurement values by using the numerical value.

The normalizing unit 133 receives a measurement time set value set by the measurement time calculating unit 135 described later (or the upper and lower limiter 136), and acquires the measurement time to be used for the calculation described above.

The respective light quantity measurement values of each of R, G, and B acquired from the light sensor 130 are described as LmR, LmG, and LmB. Moreover, the normalized light quantity measurement values with respect to the respective light quantity measurement values are described as LsR, LsG, and LsB. If the light sensor 130 receives LmR, LmG, and LmB, the normalizing unit 133 computes $LsR=LmR/T$, $LsG=LmG/T$, and $LsB=LmB/T$ (T is the measurement time), and calculates the normalized light quantity measurement values LsR, LsG, and LsB.

The light quantity reference value setting unit 134 is a functional unit that sets a light quantity reference value, being an index of the value acquired as the light quantity measurement value by the light sensor 130 for the next time, based on the normalized light quantity measurement value (LsR, LsG, and LsB) input from the normalizing unit 133, and the light quantity target value (LtR, LtG, and LtB) input from the light quantity target value calculating unit 132. Here, the light quantity reference value set by the light quantity reference value setting unit 134 is a value indicating the light quantity measurement value having an accuracy required to perform the feedback control by the BL control unit 12.

The light quantity reference value set by the light quantity reference value setting unit 134 is described as Lp.

In order to perform the feedback control accurately by the BL control unit 12, accuracy above a certain level is required for the light quantity measurement value acquired by the light sensor 130. More specifically, the light quantity measurement value itself output from the light sensor 130 needs to be a certain numerical value or more. For example, a case is considered where the acquired light quantity measurement value becomes an extremely small value as a result of setting the measurement time of the light sensor 130 to be quite short. In this case, because the normalized light quantity measurement value is calculated based on only a small light quantity detected during the short measurement time, the error increases with respect to the light quantity per unit of actual time of the backlight 10. By so doing, the normalized light quantity measurement value to be the index in the feedback control performed by the BL control unit 12 varies largely every time the measurement of the light quantity is performed, and cannot be stabilized by matching the brightness of the backlight 10 with the target brightness. That is to say, the "required accuracy" here is the amount itself of the minimum required light quantity measurement value in order to stabilize the brightness of the backlight 10 eventually with the target brightness in the feedback control performed by the BL control unit 12.

If it is assumed that the light quantity reference value setting unit 134 sets the light quantity reference value Lp as, for example, "100", the sensor control unit 131 adjusts the measurement time so that the light quantity measurement value (more precisely, the total value Lsa of the normalized light quantity measurement value for each color described later) acquired by the light sensor 130 the next time becomes substantially "100" (the process thereof will be described later). In this way, by having the light quantity reference value setting unit 134 set the light quantity reference value Lp, the sensor control unit 131 acquires the light quantity measurement values (LmR, LmG, and LmB) acquired by the light sensor 130 the next time, as values having an accuracy above a certain level based on the light quantity reference value Lp.

Moreover, the light quantity reference value setting unit 134 according to the present exemplary embodiment performs a process to determine a state of the backlight 10 (convergence state, non-convergence state), and also sets the light quantity reference values Lp being different according to the state of the backlight 10. Here the "convergence state" is a state in which the measured brightness of the backlight 10 approximates to a predetermined range with respect to the target brightness. On the other hand, the "non-convergence state" is a state in which the measured brightness of the backlight 10 is not yet within the predetermined range with respect to the target brightness.

Specifically, the light quantity reference value setting unit 134 compares the normalized light quantity measurement value (LsR, LsG, and LsB) input from the normalizing unit 133, with the light quantity target value (LtR, LtG, and LtB) input from the light quantity target value calculating unit 132, to determine the state of the backlight 10. The light quantity reference value setting unit 134 sets the above-described light quantity reference value Lp to a different value according to the determined state (convergence state or non-convergence state). More specifically, the light quantity reference value setting unit 134 sets the light quantity reference value Lp to a different value (a first reference value and a second reference value described later) respectively for each case where the normalized light quantity measurement value (LsR, LsG, and LsB) calculated based on the light quantity measurement value of the light sensor 130, and the light quantity target value (LtR, LtG, and LtB) calculated by the light quantity target value calculating unit 132, are largely different from each other (the non-convergence state), and a case where both values are close to each other (the convergence state). The process and an effect thereof will be described later.

The measurement time calculating unit 135 sets the measurement time for when the light sensor 130 acquires the light quantity measurement value a next time, based on the normalized light quantity measurement values (LsR, LsG, and LsB), and the light quantity reference value Lp set by the light quantity reference value setting unit 134. More specifically, the measurement time calculating unit 135 divides the light quantity reference value Lp by a light quantity measurement total value Lsa obtained by combining the normalized light quantity measurement value for each color (LsR, LsG, and LsB) (Lsa=LsR+LsG+LsB), and calculates a measurement time set value T=Lp/Lsa. Then the measurement time calculating unit 135 outputs the measurement time set value T to the light sensor 130 as the measurement time for when the light sensor 130 acquires the light quantity measurement value (LmR, LmG and LmB) the next time.

For example, it is assumed here that the light quantity reference value setting unit 134 sets the light quantity reference value Lp as "100". Then at this time, it is assumed that the normalized light quantity measurement value based on detection of the light sensor 130 is respectively LsR=80, LsG=100, and LsB=70. By so doing, the measurement time calculating unit 135 calculates the light quantity total value Lsa as Lsa=80+100+70=250. Moreover, the measurement time calculating unit 135 calculates the measurement time set value T as T=100/250=0.4 [s]. The light sensor 130 that has received the measurement time set value T (=0.4 [s]) sets the next measurement time as 0.4 [s], and starts a new measurement.

On the other hand, it is assumed that the light quantity reference value setting unit 134 sets the light quantity reference value Lp as "1000". At this time, if the normalized light quantity measurement values based on the detection of the light sensor 130 are the same as the above-described values, the measurement time calculating unit 135 calculates the measurement time set value T as T=1000/250=4 [s]. The light sensor 130 that has received the measurement time set value T (=4 [s]) sets the next measurement time as 4 [s], and starts a new measurement.

As described above, the measurement time calculating unit 135 designates a value having a positive correlation with the light quantity reference value Lp set by the light quantity reference value setting unit 134 as the measurement time for when the light sensor 130 acquires the light quantity measurement value the next time.

The upper and lower limiter 136 is a functional unit that, if the value obtained by dividing the light quantity reference value Tp by the light quantity total value Lsa exceeds a predetermined upper limit Tmax, sets the measurement time set value T to the upper limit Tmax, and if the value obtained by dividing the light quantity reference value Tp by the light quantity total value Lsa falls below a predetermined lower limit Tmin, sets the measurement time set value T to the lower limit Tmin. That is to say, it is considered that the measurement time set value T calculated by the measurement time calculating unit 135 becomes an extremely large value or an extremely small value due to an influence of the light quantity measurement value. In this case, the upper and lower limiter 136 performs a process so that the measurement time set value T is always within an appropriate range (between the upper limit Tmax and the lower limit Tmin) to realize the feedback control.

By performing such a process, it is possible to prevent a situation where the feedback control performed by the BL control unit 12 uniquely slows down or becomes unstable depending on the light quantity measurement value acquired by the light sensor 130.

Figure 4:
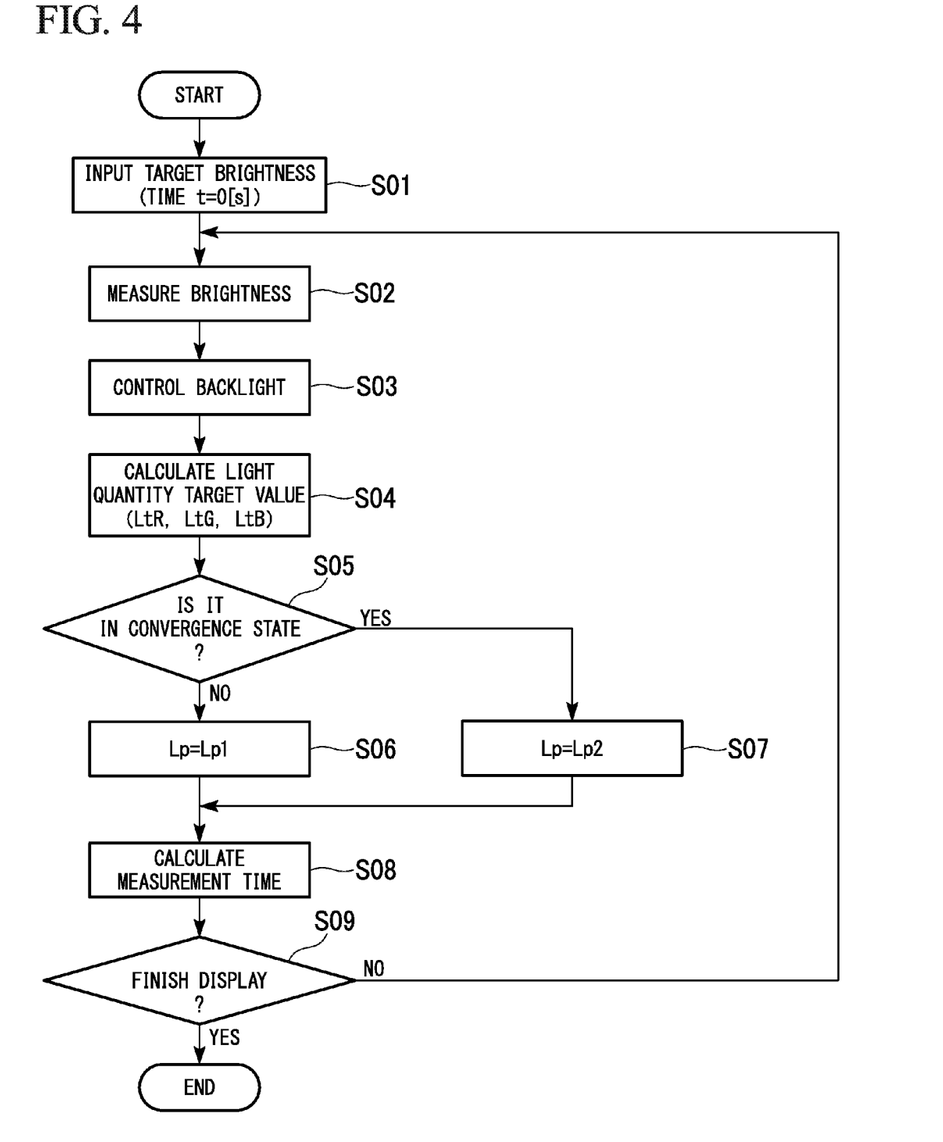
FIG. 4 is a diagram showing a processing flow of the sensor device according to the first exemplary embodiment of the present invention.

FIG. 4 is a diagram showing a process flow of the sensor device according to the first exemplary embodiment of the present invention.

Next a process flow of the BL control unit 12 and the sensor device 13 according to the present exemplary embodiment will be described step by step with reference to FIG. 4.

At first, at a time t=0 [s], it is assumed that the user inputs a setting of a new brightness to the liquid crystal display device 1. The BL control unit 12, and the sensor control unit 131 of the sensor device 13 receive a target brightness, being the set value thereof (step S01, FIG. 2). At this time, it is assumed that the target brightness input by the user is "100".

Moreover, the BL control unit 12 performs a process to measure the brightness of the backlight 10 at present (step S02). Specifically, the light sensor 130 of the sensor device 13 acquires light quantity measurement values (LmR, LmG, and LmB) of the respective colors of the light emitted from the backlight 10 (the measurement time at this time has been acquired in step S08 described later and executed in the past). Then the normalizing unit 133 of the sensor control unit 131 receives the light quantity measurement values (LR, LmG, and LmB) of the respective colors acquired by the light sensor 130, and the measurement time set value T calculated in step S08 described later, and calculates the normalized light quantity measurement values (LsR, LsG; and LsB)=(LmR/T, LmG/T, and LmB/T). The normalizing unit 133 outputs the normalized light quantity measurement values to the BL control unit 12. The BL control unit 12 receives the normalized light quantity measurement values and calculates the measured brightness of the backlight 10 at this point of time. It is assumed that the measured brightness of the backlight 10 based on the normalized light quantity measurement values (LsR, LsG, and LsB) acquired by the sensor device 13 at this time is "250".

Next, the BL control unit 12 compares the target brightness (100) newly set by the user, with the measured brightness (250) based on the light quantity measurement values (the normalized light quantity measurement values) input by the sensor device 13, and immediately starts the control to match the measured brightness with the target brightness (step S03). In this case, because the target brightness (100) is lower than the measured brightness (250), specifically, the BL control unit 12 starts the process to decrease the light quantity of the LED, being the light source of the backlight 10.

On the other hand, the light quantity target value calculating unit 132 of the sensor control unit 131 that has received the newly set target brightness, calculates the light quantity target values (LtR, LtG, and LtB) based on the input target brightness (100) (step S04). Here the light quantity target value calculating unit 132 calculates the respective values of LtR, LtG, and LtB so that the brightness calculated based on LtR, LtG, and LtB matches with the input target brightness, and so that the condition to maintain the color balance that has been set before setting of the target brightness is satisfied. For example, if it is assumed that the set color balance is R:G:B=1:1:1, the light quantity target value calculating unit 132 calculates the respective values of the light quantity target values so that the brightness calculated based on LtR, LtG, and LtB becomes the target brightness (100), while satisfying the condition of LtR:LtG:LtB=1:1:1 (that is to say, LtR=LtG=LtB).

Next, the light quantity reference value setting unit 134 performs a process to determine the state of the backlight 10 (convergence state, non-convergence state) (step S05). Specifically, the light quantity reference value setting unit 134 receives the normalized light quantity measurement values (LtR, LtG, and LtB) calculated in step S02, and the light quantity target values (LtR, LtG, and LtB) calculated in step S04. Then it calculates a difference value LdR=|LsR−LtR|, LdG=|LsG−LtG|, and LdB=|LsB−LtB|, being absolute values of the difference between the normalized light quantity measurement values (LsR, LsG, and LsB) and the light quantity target values (LtR, LtG, and LtB). Moreover, if any of the respective difference values (LdR, LdG, and LdB) exceeds a predetermined brightness threshold Lth (LdR>Lth, LdG>Lth, or LdB>Lth), the light quantity reference value setting unit 134 determines that the backlight 10 is in the "non-convergence state" (NO in step S05). On the other hand, if all respective difference values (LdR, LdG and LdB) are equal to or lower than the predetermined brightness threshold Lth (LdR≤Lth, LdG≤Lth, and LdB≤Lth), the light quantity reference value setting unit 134 determines that the backlight 10 is in the "convergence state" (YES in step S05).

The brightness threshold Lth may be a predetermined fixed range (for example, ±10), or may be set based on a ratio based on the light quantity target value (for example, ±10% of the respective LtR, LtG, and LtB). Moreover, both the values set based on the above-described fixed range or the ratio may be used according to the light quantity target value.

When determined that the backlight 10 is in the non-convergence state, the light quantity reference value setting unit 134 performs a process to set the light quantity reference value Lp as a first reference value Lp1 (step S06). Here it is assumed that the first reference value Lp1 is, for example, "100".

On the other hand, when determined that the backlight 10 is in the convergence state, the light quantity reference value setting unit 134 performs a process to set the light quantity reference value Lp as a second reference value Lp2, which is larger than the first reference value Lp1 (step S07). Here it is assumed that the second reference value Lp2 is, for example, "1000".

Subsequently, the measurement time calculating unit 135 receives the light quantity reference value Lp=Lp1 (100) or Lp=Lp2 (1000) set by the light quantity reference value setting unit 134 in step S06 or step S07, and the normalized light quantity measurement values (LsR, LsG, LsB), and performs a process to calculate the measurement time set value T (step S08). Specifically, the measurement time calculating unit 135 first calculates the light quantity total value Lsa=LsR+LsG+LsB. Moreover, in the case of NO in step S05, the measurement time calculating unit 135 outputs the measurement time set value T (=Lp1/Lsa [s]), being a value obtained by dividing the light quantity reference value Lp=Lp1 by the light quantity total value Lsa, to the light sensor 130. On the other hand, in the case of YES in step S05, it outputs the measurement time set value T (=Lp2/Lsa [s]), being a value obtained by dividing the light quantity reference value Lp=Lp2 by the light quantity total value Lsa, to the light sensor 130. The light sensor 130 sets the measurement time for when the light quantity measurement value is acquired a next time, based on the input measurement time set value T. Simultaneously, the measurement time calculating unit 135 outputs the measurement time set value T also to the normalizing unit 133.

By so doing, the measurement time calculating unit 135 calculates the measurement time in such a manner that the measurement time in the case where any of the difference values (LdR, LdG, LdB) exceeds the predetermined light quantity threshold Lth, that is, the measurement time for when the light sensor 130 acquires the light quantity measurement value a next time in the "non-convergence state" becomes shorter than the measurement time in the case where all difference values (LdR, LdG, LdB) fall below the predetermined light quantity threshold Lth, that is, the measurement time for when the light sensor 130 acquires the light quantity measurement value a next time in the "convergence state".

For example, it is assumed that the light quantity reference value setting unit 134 has determined that any of the difference values (LdR, LdG, LdB) exceeds the predetermined light quantity threshold Lth, that is, the backlight 10 is in the non-convergence state. By so doing, the light quantity reference value setting unit 134 sets the light quantity reference value Lp as Lp1 (100). Then at this time, if it is assumed that the normalized light quantity measurement values (LsR, LsG, LsB) calculated based on the light quantity measurement values acquired by the light sensor 130 are (80, 100, 70), the measurement time calculating unit 135 calculates the measurement time set value T as 0.4 [s] based on Lp1/Lsa=100/(80+100+70). The light sensor 130 receives the measurement time set value T=0.4 [s] calculated here, and sets this to the measurement time of the light quantity measurement value to be acquired the next time.

On the other hand, it is assumed that the light quantity reference value setting unit 134 has determined that all difference values (LdR, LdG, LdB) fall below the predetermined light quantity threshold Lth, that is, the backlight 10 is in the convergence state. By so doing, the light quantity reference value setting unit 134 sets the light quantity reference value Lp to Lp2 (1000). Then at this time, if it is assumed that the normalized light quantity measurement values (LsR, LsG, LsB) calculated based on the light quantity measurement values acquired by the light sensor 130 are (80, 100, 70), the measurement time calculating unit 135 calculates the measurement time set value T as 4 [s] based on Lp2/Lsa=1000/(80+100+70). The light sensor 130 receives the calculated measurement time set value T=4 [s], and sets this to the measurement time of the light quantity measurement value to be acquired the next time.

Here, if the measurement time set value T calculated in step S08 by the measurement time calculating unit 135 exceeds the predetermined upper limit Tmax, or falls below the predetermined lower limit Tmin, the upper and lower limiter 136 recalculates the measurement time set values T as Tmax or Tmin, and outputs these to the light sensor 130 and the normalizing unit 133.

Subsequently, the BL control unit 12 and the sensor device 13 determine whether display finish is input by the user (for example, a power off operation of the liquid crystal display device 1) (step S09). Here, if the power off operation is not input (NO in step S09), that is, when display by the liquid crystal display device 1 is continued, the BL control unit 12 and the sensor device 13 return to step S02 to repeat the above-described processes.

That is to say, the light sensor 130 acquires the new light quantity measurement values (LmR, LmG, and LmB) based on the measurement time set value T calculated in step S08. Subsequently, the normalizing unit 133 calculates the normalized light quantity measurement values (LsR, LsG, and LsB) based on the newly acquired light quantity measurement values (LmR, LmG, and LmB) and the measurement time set value T. Then the BL control unit 12 compares the measured brightness calculated based on the newly acquired normalized light quantity measurement values (LsR, LsG, and LsB), with the target brightness (100), and performs the process to match the measured brightness with the target brightness (100).

On the other hand, if the power off operation is input (YES in step S09), that is, if display by the liquid crystal display device 1 is finished, the BL control unit 12 and the sensor device 13 finish the respective processes.

Figure 5:
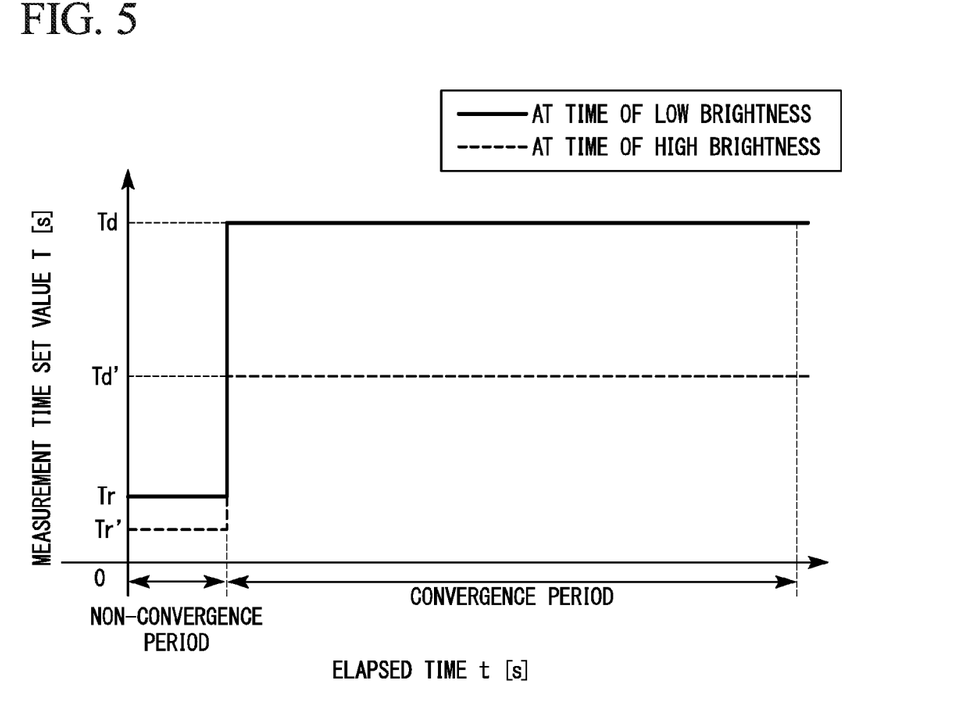
FIG. 5 is a first diagram for explaining an effect of the sensor device according to the first exemplary embodiment of the present invention.
Figure 6:
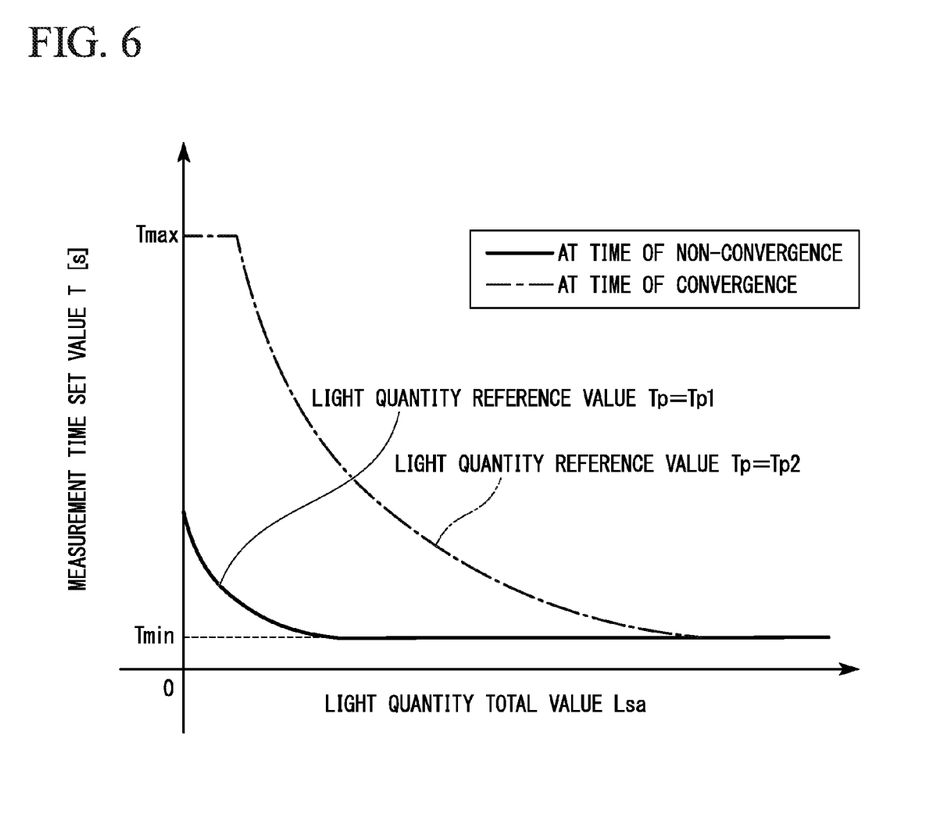
FIG. 6 is a second diagram for explaining an effect of the sensor device according to the first exemplary embodiment of the present invention.

FIG. 5 is a first diagram for explaining an effect of the sensor device according to the first exemplary embodiment of the present invention. Moreover, FIG. 6 is a second diagram for explaining an effect of the sensor device according to the first exemplary embodiment of the present invention.

Next, an effect acquired based on the process flow described with reference to FIG. 4, will be described in detail with reference to FIG. 5 and FIG. 6.

In the graph of FIG. 5, the measurement time set value T [s] set by the light sensor 130 is plotted on the vertical axis, and an elapsed time t [s] of display by the liquid crystal display device 1 is plotted on the horizontal axis. The graph of a solid line shown in FIG. 5 indicates time transition of the measurement time set value T [s] for when the target brightness is set to a lower value (for example, "100"), and the graph of the broken line indicates time transition of the measurement time set value T [s] for when the target brightness is set to a higher value (for example, "200"). It is assumed that 0 [s] of the elapsed time t is a timing at which the user inputs a setting of the brightness of the liquid crystal display device 1.

First, it is assumed that the user inputs a new setting of the brightness of the liquid crystal display device 1 at a time t=0 [s]. The BL control unit 12 and the sensor control unit 131 of the sensor device 13 receives the target brightness, being the set value thereof (step S01 in FIG. 4). Here it is assumed that the target brightness input by the user is "100", and the process is described hereunder with reference to the graph of the solid line shown in FIG. 5.

At a point of time 0 [s], the BL control unit 12 starts the control to match the newly set target brightness, with the measured brightness based on the light quantity measurement values (normalized light quantity measurement values) input by the sensor device 13 (step S02 in FIG. 4).

It is assumed that immediately after the target brightness is set by user setting, the normalized light quantity measurement values (LsR, LsG, and LsB) indicating the actual light quantity of the backlight 10 acquired by the light sensor 130 are largely different from the light quantity target values (LtR, LtG, and LtB), and any of the difference values LdR, LdG, and LdB exceeds the predetermined brightness threshold Lth. In this case, the light quantity reference value setting unit 134 determines that the backlight 10 is in the "non-convergence state" (step S05 in FIG. 4), and performs the process to set the light quantity reference value Lp as the first reference value Lp1 (100) (step S06 in FIG. 4). A period in which the backlight 10 is determined to be in the non-convergence state is shown as a "non-convergence period" in FIG. 5.

The light reference value Lp1 when the backlight 10 is determined to be in the non-convergence state is as small as 100. Therefore, as a result, the measurement time calculating unit 135 calculates a measurement time set value Tr having a small value. Consequently, in the next measurement, the light sensor 130 acquires the light quantity measurement values (TmR, TmG, TmB) of the backlight 10 with a short measurement time based on the measurement time set value Tr. By so doing, the BL control unit 12 performs the feedback control with a short time interval based on the normalized light quantity measurement values (TsR, TsG, TsB) input with the short measurement time. As a result, the brightness of the backlight 10 in the non-convergence state approximates to the target brightness rapidly in a short time.

On the other hand, when the brightness of the backlight 10 approximates to the target brightness to some extent, the light quantity reference value setting unit 134 determines that the backlight 10 is in the "convergence state" (step S05 in FIG. 4), and performs the process to set the light quantity reference value Lp as the second reference value Lp2 (1000) (step S07 in FIG. 4). A period in which the backlight 10 is determined to be in the convergence state is shown as a "convergence period" in FIG. 5.

The light quantity reference value Lp2 for when the backlight 10 is determined to be in the convergence state is as large as 1000. Therefore, as a result, the measurement time calculating unit 135 calculates a measurement time set value Td having a large value. Consequently, in the next measurement, the light sensor 130 acquires the light quantity measurement values (TmR, TmG, TmB) of the backlight 10 with a long measurement time based on the measurement time set value Td. By so doing, the BL control unit 12 performs the feedback control with a long time interval, based on the normalized light quantity measurement values (TsR, TsG, TsB) input with the long measurement time.

Here in the case where the backlight 10 is in the non-convergence state, because the brightness of the backlight 10 at present is largely different from the target brightness, the BL control unit 12 needs to change the control state considerably. Consequently, in this case, the BL control unit 12 can perform the process to approximate the brightness of the backlight 10 to the target brightness to some extent, even without high accuracy in the normalized light quantity measurement values, being the reference for the feedback control.

On the other hand, in the case where the backlight 10 is in the convergence state, it means that the brightness of the backlight 10 approximates to the target brightness to some extent. Therefore, the BL control unit 12 needs to perform accurate feedback control in the convergence state. That is to say, high accuracy is required for the normalized light quantity measurement values, being the reference for the feedback control.

That is, the light quantity reference value setting unit 134 and the measurement time calculating unit 135 according to the present exemplary embodiment calculate the short measurement time set value Tr in the non-convergence state, in which high accuracy is not required for the normalized light quantity measurement values, being the reference for the feedback control. Then, if the brightness of the backlight 10 approximates to the target brightness to some extent, and the backlight 10 enters into the convergence state, in which high accuracy is required for the normalized light quantity measurement values, the process to calculate the long measurement time set value Td is realized.

As described above, according to the sensor device 13 of the present exemplary embodiment, the short measurement time set value Tr is set in the non-convergence period in which the brightness of the backlight 10 is largely different from the target brightness, and the feedback control is sequentially and repeatedly performed in the short time interval. Therefore a convergence time until the brightness of the backlight 10 matches with the target brightness can be reduced. Moreover, in the convergence period in which the brightness of the backlight 10 approximates to the target brightness, the comparatively long measurement time set value Td is set. Therefore, highly accurate feedback control is realized.

Furthermore, the sensor device 13 according to the present exemplary embodiment also changes the measurement time of the light sensor 130 according to the brightness itself of the backlight 10. For example, as in the graph shown by the broken line in FIG. 5, if the target brightness is set higher (for example, 200), the measurement time set value T is set shorter than that of for when the target value is set lower (for example, 100). Hereunder, the process is described in detail.

In the graph of FIG. 6, the measurement time set value T [s] set by the light sensor 130 is plotted on the vertical axis, and the light quantity measurement total value Lsa based on the light quantity measurement values acquired by the light sensor 130 is plotted on the horizontal axis. The graph of the solid line in FIG. 6 shows a relation between each other in the case where the backlight 10 is in the non-convergence state, and the graph of the one-dot chain line shows a relation between each other in the case where the backlight 10 is in the convergence state.

Here as described above, the light quantity reference value setting unit 134 performs the process to set the light quantity reference value Lp to the first reference value Lp1 or the second reference value Lp2 according to the state of the backlight 10 (the convergence state or the non-convergence state) (step S06 and step S07 in FIG. 4). Then the measurement time calculating unit 135 divides the light quantity reference value Lp=Lp1 or Lp2 by the light quantity total value Lsa to calculate the measurement time set value T (=Lp1/Lsa [s] or Lp2/Lsa) (step S08 in FIG. 4).

According to the calculation, if the light quantity total value Lsa is large, the measurement time set value T decreases inversely proportional to the light quantity total value Lsa. On the contrary, if the light quantity total value Lsa is small, the measurement time set value T increases. Here, the light quantity total value Lsa has a correlation with the measured brightness of the backlight 10. Consequently, in the case where the backlight 10 does not change from the non-convergence state or the convergence state, the measurement time for when the light sensor 130 acquires the light quantity measurement value a next time is set shorter as the measured brightness of the backlight 10 by the light sensor 130 increases, and the measurement time is set longer as the measured brightness of the backlight 10 decreases.

Here, in the respective states of the backlight 10 (the non-convergence state and the convergence state), accuracy of the normalized light quantity measurement values required for the feedback control is defined based on the first reference value Lp1 and the second reference value Lp2. That is to say, if it is assumed that the first reference value Lp1 is "100", it suffices that the light quantity total value Lsa is at least about 100, in order to execute the feedback control by the BL control unit 12 in the non-convergence state.

Here, the measurement time for setting the light quantity total value Lsa to about 100 varies depending on whether the brightness of the backlight 10 is high or it is low. That is to say, when the brightness of the backlight 10 is low, the measurement time needs to be set long in order that the light quantity total value becomes about 100. However, when the brightness of the backlight 10 is high, the light quantity total value can be maintained to be about 100, even if the measurement time is set short corresponding to this.

Consequently, the measurement time calculating unit 135 calculates the measurement time set value T by dividing the light quantity reference value Lp=Lp1 or Lp2 by the light quantity total value Lsa, thereby enabling to set the measurement time in order to achieve the accuracy (for example Lp1) required for performing the feedback control, to an appropriate value corresponding to the brightness of the backlight 10 (light quantity total value Lsa).

As described above, according to the sensor device 13 of the present exemplary embodiment, in the range in which the accuracy required for the feedback control can be acquired, the process to set the measurement time shorter as the brightness of the backlight 10 increases is performed. Therefore, the convergence time until the brightness of the backlight 10 matches with the target brightness can be reduced further.

Moreover, the sensor device 13 according to the present exemplary embodiment further characterized in that it sets the measurement time set value T so that the light quantity total value Lsa of the normalized light quantity measurement values (=LsR+LsG+LsB) to be measured next time becomes the light quantity reference value Lp.

Thus by so doing, the sensor device 13 can continuously acquire a certain level of accuracy required for the feedback control by the BL control unit 12, regardless of the color balance of the backlight 10, that is, the ratio of the normalized light quantity measurement values (LsR, LsG, LsB).

Moreover, according to the sensor device 13 of the present exemplary embodiment, although the measurement time changes according to an individual difference or change over time of sensor sensitivity of the light sensor 130, a certain level of accuracy can be acquired all the time, regardless of these factors.

Consequently, according to the sensor device 13, the yield of liquid crystal display devices 1 including it, and the product life cycle can be improved.

Furthermore, in the sensor device 13 according to the present exemplary embodiment, if the measurement time set value T calculated by the measurement time calculating unit 135 exceeds the predetermined upper limit Tmax or falls below the predetermined lower limit Tmin, the upper and lower limiter 136 operates to reset the measurement time set value T to Tmax or Tmin respectively, and output this to the light sensor 130 and the normalizing unit 133.

Accordingly, if the normalized light quantity measurement value calculated based on the light sensor 130 is measured to be extremely small, it is possible to prevent a situation where the measurement time set value T is set extremely large, and slows down the feedback control performed by the BL control unit 12. Moreover, if the normalized light quantity measurement values calculated based on the light sensor 130 is measured to be extremely large, it is possible to prevent a situation where the measurement time set value T is set extremely small, and makes the feedback control by the BL control unit 12 unstable.

The above-described sensor device 13 according to the present exemplary embodiment is not limited to the above-described exemplary embodiment.

For example, the above-described sensor device 13 according to the present exemplary embodiment sets the measurement time set value T so that the light quantity total value Lsa of the normalized light quantity measurement values (=LsR+LsG+LsB) to be measured the next time becomes the light quantity reference value Lp. However, the sensor device 13 according to another exemplary embodiment is not limited to this method. For example, the sensor device 13 according to the other exemplary embodiment may set the measurement time set value T based on only one of the normalized light quantity measurement values (LsR, LsG, and LsB).

Moreover, in the sensor device 13 according to the present exemplary embodiment, it has been described that the light sensor 130 is a digital color sensor that acquires the light quantity measurement value (LmR, LmG, LmB) for each color of R, G, and B. However, the sensor device 13 according to another exemplary embodiment is not limited to this exemplary embodiment. That is to say, in the sensor device 13 according to the other exemplary embodiment, the light sensor 130 may be a digital color sensor that can detect the light quantity measurement value of a color other than R, G, and B (for example, Y (yellow)). In this case, it is designated that the BL control unit 12 performs the feedback control of the backlight 10 based on the normalized light quantity measurement values of four colors of R, G, B, and Y. Moreover, in this case, for example, the measurement time calculating unit 135 calculates the measurement time set value T by using a value of the added the normalized light quantity measurement values of four colors, as the light quantity total value Lsa.

A program for realizing the respective functions of the sensor control unit 131 in FIG. 2 may be recorded in a computer readable recording medium, and the program recorded in the recording medium may be read and executed by a computer system, thereby performing the process flow shown in FIG. 4.

Furthermore, the "computer readable recording medium" stands for portable media such as a flexible disk, a magnetooptic disk, a ROM, and a CD-ROM, or a storage device such as a hard disk incorporated in the computer system. Furthermore, the "computer readable recording medium" includes a medium that holds a program for a certain period of time such as a volatile memory in the computer system, which becomes a server or a client. Moreover the above program may realize a part of the functions described above, and may be one that can realize the functions described above in combination with a program recorded beforehand in the computer system. Furthermore, the above program may be stored in a predetermined server, and distributed (downloaded or the like) via a communication line in response to a request from another device.

As described above, the exemplary embodiments of the present invention have been described in detail with reference to the drawings. However, the specific configurations are not limited thereto, and also include various designs that do not depart from the scope of the present invention.

REFERENCE SYMBOLS

1 Liquid crystal display device
10 Backlight
11 Liquid crystal panel
12 BL control unit
13 Sensor device
130 Light sensor
131 Sensor control unit
132 Light quantity target value calculating unit
133 Normalizing unit
134 Light quantity reference value setting unit
135 Measurement time calculating unit
136 Upper and lower limiter

The invention claimed is:
1. A sensor device, comprising:
a light sensor that acquires a first light quantity measurement value that is proportional to a light quantity of a backlight and a first measurement time;
a light quantity target value calculating unit that calculates a light quantity target value based on a user setting for the backlight;
a measurement time calculating unit that calculates a second measurement time for when the light sensor acquires a second light quantity measurement value a next time, based on the acquired first light quantity measurement value and the light quantity target value;
a normalizing unit that divides the acquired first light quantity measurement value by the first measurement time, to obtain a normalized light quantity measurement value; and
a light quantity reference value setting unit that calculates an absolute value of a difference between the normalized light quantity measurement value and the light quantity target value.

2. The sensor device according to claim 1,
wherein the measurement time calculating unit sets the second measurement time in such a manner that the second measurement time in a case where the absolute value exceeds a light quantity threshold becomes shorter than the second measurement time in a case where the absolute value falls below the light quantity threshold.

3. A liquid crystal display device, comprising:
the sensor device according to claim 1; and
a backlight control unit that adjusts a brightness of the backlight, based on the first light quantity measurement value acquired by the light sensor.

4. A sensor device, comprising:
a light sensor that acquires a first light quantity measurement value that is proportional to a light quantity of a backlight and a first measurement time;
a light quantity target value calculating unit that calculates a light quantity target value based on a user setting for the backlight;
a measurement time calculating unit that calculates a second measurement time for when the light sensor acquires a second light quantity measurement value a next time, based on the acquired first light quantity measurement value and the light quantity target value;
a normalizing unit that divides the acquired first light quantity measurement value by the first measurement time, to obtain a normalized light quantity measurement value; and
a light quantity reference value setting unit that sets a light quantity reference value based on the normalized light quantity measurement value and the light quantity target value, the light quantity reference value being an index of a value acquired as the second light quantity measurement value,
wherein the measurement time calculating unit calculates the second measurement time based on the normalized light quantity measurement value and the light quantity reference value.

5. The sensor device according to claim 4, wherein the light quantity reference value setting unit calculates an absolute value of a difference between the normalized light quantity measurement value and the light quantity target value,
wherein the light quantity reference value setting unit sets the light quantity reference value as a first reference value when the absolute value exceeds the light quantity threshold,
wherein the light quantity reference value setting unit sets the light quantity reference value to a second reference value when the absolute value falls below the light quantity threshold, the second reference value being larger than the first reference value, and wherein the measurement time calculating unit calculates, as the second measurement time, a value having a positive correlation with the light quantity reference value that are set as the first reference value or the second reference value.

6. The sensor device according to claim 5, wherein the light sensor acquires the first light quantity measurement value for each color of at least two colors, wherein the normalizing unit divides the acquired first light quantity measurement value for each color by the first measurement time, to obtain the normalized light quantity measurement value for each color, wherein the measurement time calculating unit adds the normalized light quantity measurement value for each color, to obtain a light quantity measurement total value, and wherein the measurement time calculating unit divides the light quantity reference value that is set as the first reference value or the second reference value by the light quantity measurement total value, to obtain a first value as the second measurement time.

7. The sensor device according to claim 6, further comprising:

an upper and lower limiter that resets the second measurement time as an upper limit when the first value exceeds the upper limit, the upper and lower limiter resetting the second measurement time as a lower limit when the first value falls below the lower limit.

8. A sensing method, comprising:

acquiring a first light quantity measurement value that is proportional to a light quantity of a backlight and a first measurement time;

calculating a light quantity target value based on a user setting for the backlight;

calculating a second measurement time for when a second light quantity measurement value is acquired a next time, based on the acquired first light quantity measurement value and the light quantity target value;

dividing the acquired first light quantity measurement value by the first measurement time, to obtain a normalized light quantity measurement value; and calculating an absolute value of a difference between the normalized light quantity measurement value and the light quantity target value.

9. A sensing method, comprising:

acquiring a first light quantity measurement value that is proportional to a light quantity of a backlight and a first measurement time;

calculating a light quantity target value based on a user setting for the backlight;

calculating a second measurement time for when the light sensor acquires a second light quantity measurement value a next time, based on the acquired first light quantity measurement value and the light quantity target value;

dividing the acquired first light quantity measurement value by the first measurement time, to obtain a normalized light quantity measurement value; and setting a light quantity reference value based on the normalized light quantity measurement value and the light quantity target value, the light quantity reference value being an index of a value acquired as the second light quantity measurement value, wherein the second measurement time is calculated based on the normalized light quantity measurement value and the light quantity reference value.

* * * * *